United States Patent
Suzuki et al.

[11] Patent Number: 5,736,254
[45] Date of Patent: Apr. 7, 1998

[54] MULTILAYER LAMINATE

[75] Inventors: Seiji Suzuki, Nagoya; Toshitsugu Kikuchi, Toyonaka, both of Japan

[73] Assignee: Sumitomo Chemical Company, Limited, Osaka, Japan

[21] Appl. No.: 641,269

[22] Filed: Apr. 30, 1996

Related U.S. Application Data

[63] Continuation of Ser. No. 244,460, filed as PCT/JP93/01410, Oct. 1, 1993, published as WO94/07689, Apr. 14, 1994, abandoned.

[30] Foreign Application Priority Data

Oct. 2, 1992 [JP] Japan ................... 4-264825

[51] Int. Cl.⁶ ................... B32B 15/08; B32B 15/14
[52] U.S. Cl. ................... 428/461; 428/368; 428/457; 156/309.6; 156/312
[58] Field of Search ................... 428/332, 364, 428/368, 401, 457, 458, 461; 156/273.3, 273.5, 285, 309.6, 310, 311, 312

[56] References Cited

U.S. PATENT DOCUMENTS

| | | | |
|---|---|---|---|
| 4,048,366 | 9/1977 | Kingsbury | 428/215 |
| 4,390,489 | 6/1983 | Segal | 264/126 |
| 4,833,005 | 5/1989 | Klaar et al. | 428/224 |
| 4,992,323 | 2/1991 | Vogelesang et al. | 428/215 |
| 5,071,702 | 12/1991 | Matsuura et al. | 428/290 |
| 5,164,141 | 11/1992 | Becker et al. | 264/257 |
| 5,219,629 | 6/1993 | Sobolev | 428/35.9 |

FOREIGN PATENT DOCUMENTS

| | | |
|---|---|---|
| 57-70648 | 5/1982 | Japan . |
| 57-201650 | 12/1982 | Japan . |
| 62-65210 | 4/1987 | Japan . |
| 3-58836 | 3/1991 | Japan . |
| 4-207139 | 7/1992 | Japan . |
| 9005633 | 5/1990 | WIPO . |

OTHER PUBLICATIONS

European Patent Office Search Report dated Feb. 6, 1995.

*Primary Examiner*—Daniel Zirker
*Attorney, Agent, or Firm*—Cushman Darby & Cushman IP Group of Pillsbury Madison & Sutro, LLP

[57] ABSTRACT

The present invention relates to a multilayer laminate obtained by laminating a fiber-reinforced thermoplastic resin layer containing reinforcing fiber, on one or each side of a metal plate, and said multilayer laminate exhibits characteristics of the fiber-reinforced thermoplastic resin (e.g. freedom from rusting and corrosion, excellent sound damping and insulation effect, and excellent vibration damping effect) as they are, and moreover retains the excellent mechanical strength of the metal plate.

8 Claims, 3 Drawing Sheets

MULTILAYER LAMINATE

This is a continuation of application Ser. No. 08/244,460, filed as PCT/JP93/01410, Oct. 1, 1993 published as WO94/07689, Apr. 14, 1994, which was abandoned upon the filing hereof.

TECHNICAL FIELD

The present invention relates to a multilayer laminate having a super impact absorptivity obtained by laminating a fiber-reinforced thermoplastic resin layer containing reinforcing fiber, on one or each side of a metal plate.

BACKGROUND ART

Metal plates are characterized by having an excellent mechanical strength and have heretofore been used as various materials. But, they are not sufficiently light in weight, are subject to rusting and corrosion because of their low water resistance and chemical resistance, and have been unsuitable for use as impact-resistant boards, vibration-damping boards, acoustic insulation materials, etc. because of direct reflection of impacts, vibrations, sounds, etc. from the outside on the metal plates.

As materials free from such defects of the metal plates, there are known, for example, laminates obtained by coating or plating one side or both sides of a metal plate with a resin for preventing rusting and corrosion.

However, although such laminates possess somewhat improved resistance to rusting and corrosion, they involve the following problem: because of their very thin resin layer(s), pinholes are formed, or the resin layer is injured by a slight impact, so that a metal portion is exposed to be rusted. Therefore, they cannot be said to be stable to rusting and corrosion for a long period of time.

Moreover, they have been unusable as impact-resistant boards, vibration-damping boards, acoustic insulation materials, etc. because impacts, vibrations, sounds, etc. from the outside are reflected on the metal plate without absorption and reduction.

DISCLOSURE OF THE INVENTION

In view of such conditions, the present inventors earnestly investigated for solving such problems and developing a multilayer laminate having a super impact absorptivity whose metal plate is not rusted or attacked by exposure of a metal portion due to a pinhole or a scratch and which can be utilized also as an impact-resistant board, vibration-damping board, acoustic insulation material, etc. Consequently, the present invention has been accomplished.

The present invention provides a multilayer laminate having a super impact absorptivity characterized in that it is obtained by laminating a fiber-reinforced thermoplastic resin layer containing reinforcing fiber, on one or each side of a metal plate.

BEST MODE FOR CARRYING OUT THE INVENTION

Figure 1A:
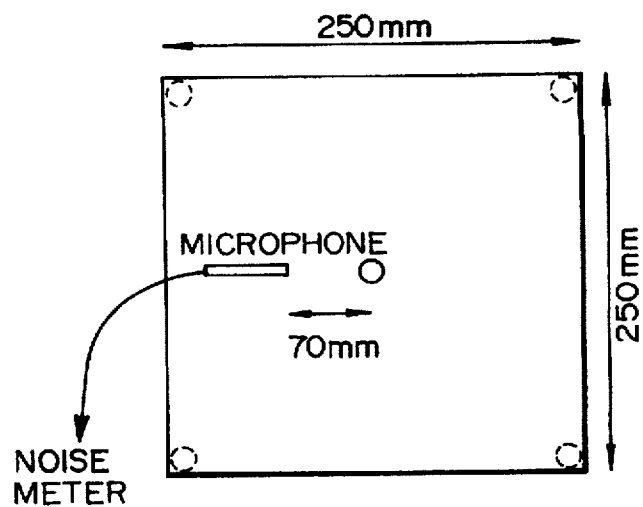
FIG. 1(A) shows a super impact absorptivity (noise and/or vibration) equipment.

In the multilayer laminate of the present invention, the metal plate includes, for example, various metal plates such as common steel plates, ultrahigh-tensile steel plates, stainless steel plates, vibration-damping steel plates, aluminum plates, copper plates, etc. The metal plate is not critical and the above-exemplified metal plates are properly chosen depending on each purpose of use. The thickness and shape of the metal plate are also not critical and are properly chosen depending on purpose of use.

The fiber-reinforced thermoplastic resin layer(s) containing reinforcing fiber is composed of the fiber for giving added strength (the reinforcing fiber) and any of various thermoplastic resins which constitutes a matrix.

As the reinforcing fiber, there are usually used inorganic fibers such as glass fiber, carbon fiber, alumina fiber, etc. In particular, glass fiber is preferably used.

Although the fiber length of the reinforcing fiber is not critical, it is preferably 1 mm or more, particularly preferably 10 mm or more, from the viewpoint of the performance characteristics of the multilayer laminate.

As the thermoplastic resin, there are exemplified various thermoplastic resins such as polypropylenes, polyesters, etc.

Although a combination of the above-exemplified reinforcing fiber and thermoplastic resin is properly determined depending on each purpose of use, a fiber-reinforced thermoplastic resin composed of a combination of glass fiber and a polypropylene is usually used.

The blending proportions of the two are properly chosen in a well-known range employed for producing a fiber-reinforced thermoplastic resin.

The multilayer laminate of the present invention is obtained by laminating a fiber-reinforced thermoplastic resin layer on one or each side of a metal plate, as described above. It may have either a two-layer structure produced by forming the resin layer only on one side of the metal plate, or a three-layer structure produced by forming the resin layer on each side of the metal plate. Depending on purpose of use, the multilayer laminate may have a four-layer or higher-order structure produced by laminating metal plate(s) and resin layer(s) alternately on one or each side of a multilayer laminate having the two- or three-layer structure. A multilayer laminate having a fiber-reinforced thermoplastic resin layer as outermost layer is preferable for the purpose. A multilayer laminate having the three-layer structure produced by forming the resin layer on each side of the metal plate is particularly preferable.

In such a multilayer laminate, the thickness of the fiber-reinforced thermoplastic resin layer(s) is varied depending on each purpose of use. When the thickness is too small, the multilayer laminate cannot have satisfactory performance characteristics. Therefore, the thickness is preferably 0.2 mm or more, particularly preferably 0.5 mm or more.

The multilayer laminate of the present invention can be produced by using as a starting material either at least one fiber-reinforced thermoplastic resin sheet called, for example, "stampable sheet" which is previously prepared by making a fiber-reinforced thermoplastic resin containing the above-mentioned reinforcing fiber into a sheet, or at least one web obtained as a semi-finished product in the course of producing such a sheet (the sheet and the web are hereinafter generically referred to as "fiber-reinforced thermoplastic resin sheet"), and bonding the fiber-reinforced thermoplastic resin sheet(s) to a metal plate with an adhesive or the like directly or through an intermediate layer. Most preferable is a process in which a fiber-reinforced thermoplastic resin sheet is laminated on one or each side of a metal plate by heat fusion of the thermoplastic resin in the sheet.

A typical example of the process using heat fusion is a process in which a metal plate which may be in a preheated state is placed on a fiber-reinforced thermoplastic resin sheet which have been previously heated in a heating oven set at a predetermined temperature to such an extent that the resin in at least the surface portion is melted to become sufficiently flowable, and the resulting assembly is compressed.

The heating temperature in this case is varied depending on the matrix resin in the fiber-reinforced thermoplastic resin sheet. For example, when the matrix resin is a polypropylene, the heating temperature is usually 160°–230° C., preferably 180°–220° C.

Usually, the compressive force in the above process is preferably 5 to 300 kg/cm$^2$, particularly preferably 10 to 200 kg/cm$^2$, for giving the resin a sufficient flowability and a sufficient adhesion to the surface of the metal plate.

The compression time is usually 10 to 300 seconds, preferably 30 to 200 seconds.

A multilayer laminate having a three-layer or higher-order structure can be produced, for example, by setting in a press molding machine a fiber-reinforced thermoplastic resin sheet previously heated to such an extent that the resin in at least the surface portion is melted to become sufficiently flowable, placing a metal plate on the sheet, placing on the metal sheet the same fiber-reinforced thermoplastic resin sheet as above which has been previously heated to such an extent that the resin in at least the surface portion is melted to become sufficiently flowable, and then compressing the resulting assembly.

As another production process, it is also possible to produce a multilayer molded plate by placing a metal plate and at least one fiber-reinforced thermoplastic resin sheet one upon another in a press molding machine so as to form a desired laminated structure, and then compressing the resulting assembly after or while heating the press molding machine to such an extent that the resin in the sheet(s) is melted.

When this process is employed, the heating temperature, the compressive force and the like are the same as above.

In these processes, when a metal plate and two fiber-reinforced thermoplastic resin sheets are set so that during the compression, the molten resins in the upper and lower sheets holding the metal sheet between them may flow to enable the upper and lower sheets to melt together directly at the end of the metal plate, there can be obtained a multilayer laminate in which not only the surfaces but also ends of the metal plate have been completely enveloped (that is encapsulated) in a resin layer.

When the metal sheet is held between the sheets, making one or two small holes previously in the metal plate causes direct fusion of the resins in the upper and lower sheets through the holes, so that there can be obtained a multilayer laminate composed of the metal plate and the fiber-reinforced thermoplastic resin sheets more firmly laminated thereon.

Since the multilayer laminate of the present invention is composed of a metal plate and a fiber-reinforced thermoplastic resin integrally laminated thereon, it has the following effects: although the thickness of a product itself is somewhat increased for attaining a required strength, the weight of the product can be reduced; and since the resin layer(s) on the metal surface is thick and tough, the multilayer laminate is free from the problems of rusting and corrosion and hence is stable for a long period of time.

Furthermore, since the resin layer(s) of the surface(s) of the multilayer laminate of the present invention has various excellent properties, for example, sound-absorbing effect and sound-damping effect as performance characteristics of the fiber-reinforced thermoplastic resin itself, and a marked vibration-damping effect, the combination of properties of the metal plate and such properties of the resin layer(s) permits advantageous employment of the multilayer laminate as an acoustic insulation material, impact-resistant board, vibration-damping board, heat insulating material, etc. which are excellent in mechanical strength.

Particularly when an insulating material such as glass fiber is used as the reinforcing fiber, the multilayer laminate of the present invention can be used for very various purposes, for example, it can be used also as an insulating structural material excellent in mechanical strength.

The super impact absorptivity of the multilayer laminate of the present invention is shown by a noise level and/or a vibration damping rate when an impact force applied.

Figure 1B:
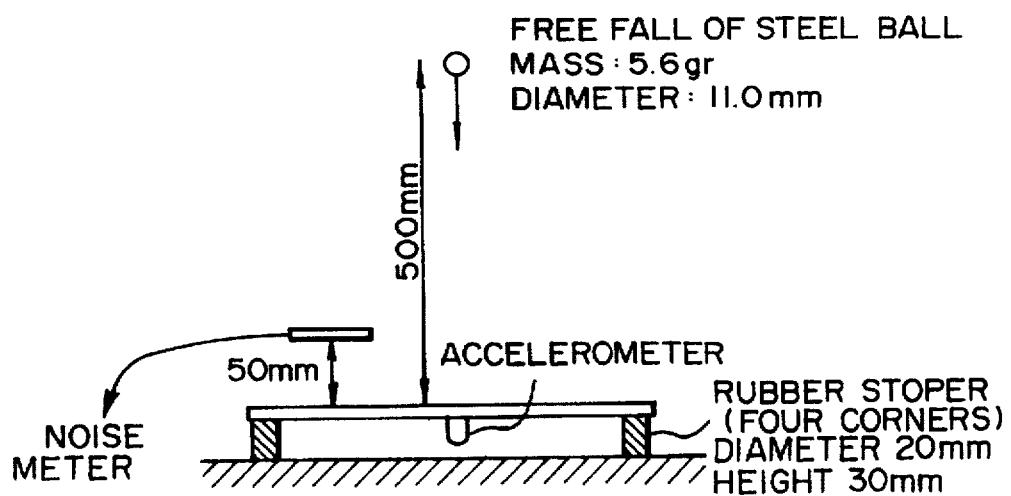
FIG. 1(B) shows an outline of a method for measuring super impact absorptivity (noise and/or vibration) by means of said equipment.

The noise level at impact is preferably 125 dBA or below as determined by measuring a level of noise through a microphone placed in a predetermined position at a distance of about 50 mm from the multilayer at a distance of about 50 mm from the multilayer laminate after falling freely a steel ball with a diameter of about 11.0 mm and a mass of about 5.6 g from a height of about 500 mm as shown in FIG. 1(B).

The vibration damping rate at impact is preferably 1 G or below after about 0.4 seconds as determined by measuring a strength of a vibration by means of an accelerometer attached to side reverse to the impact portion after falling freely a steel ball with a diameter of about 11.0 mm and a mass of about 5.6 g from a height of about 500 mm as shown in FIG. 1(B).

EXAMPLES

The present invention is illustrated below in further detail with examples, but needless to say, the present invention is not limited by them.

Example 1

A stampable sheet with a basis weight of 1,000 g/m$^2$ composed of glass fiber containing 80% or more of glass fiber with a fiber length of 10 mm or more and a polypropylene resin in a wt % ratio of 4:6 (KP-sheet, a trade name, mfd. by K-PLASHEET CORPORATION) was cut into sheets 290 mm square, and two of them were heated for 4 to 5 minutes in a heating oven set at 240° C. In this case, the surface temperature of these sheets was 210° C., and in their surfaces, the molten resin was in a fluid state.

One of the heated sheets was set in a 300×300 mm press die maintained at 60° C., after which a 290×290 mm common steel plate (SS41) of 0.8 mm thickness was placed on this sheet, and the other heated sheet was placed on the steel plate in the same manner as above. The resulting assembly was compressed at a surface pressure of 70 kg/cm$^2$ for 60 seconds to obtain a three-layer laminate of 2.5 mm thickness having a structure of fiber-reinforced thermoplastic resin layer/steel plate/fiber-reinforced thermoplastic resin layer in which the whole periphery had been enveloped in the resin in the upper and lower sheets.

The surface of the product had no exposed metal portion and the surface of the steel plate had been covered with the fiber-reinforced thermoplastic resin adhering completely thereto.

Physical properties of the obtained multilayer laminate are shown in Table 1, and the results of evaluating its chemical resistance in Table 2.

Example 2

In the same manner as in Example 1 except for using a common steel plate of 0.6 mm thickness in place of the common steel plate of 0.8 mm thickness, there was obtained a three-layer laminate of 2.1 mm thickness having a structure of fiber-reinforced thermoplastic resin layer/steel plate/fiber-reinforced thermoplastic resin layer in which the whole periphery had been enveloped in the resin in the upper and lower sheets.

The surface of the product had no exposed metal portion and the surface of the steel plate had been covered with the fiber-reinforced thermoplastic resin adhering completely thereto.

Physical properties of the obtained multilayer laminate are shown in Table 1.

Example 3

In a pressing machine were set 300×300 mm product-like sheets (webs) obtained in the course of producing stampable sheets with a basis weight of 1,000 g/m$^2$ composed of glass fiber containing 80% or more of glass fiber with a fiber length of 10 mm or more and a polypropylene resin in a wt % ratio of 4:6 (KP-sheet, a trade name, mfd. by K PLASHEET CORPORATION) and a 300×300 mm aluminum plate of 0.6 mm thickness having 9 circular holes with a radius of 5 mm located substantialy uniformly, in the following order: the web/the aluminum plate/the web. They were heated to 180° C. while applying a surface pressure of 70 kg/cm$^2$.

The heated state was maintained for 60 seconds to obtain a three-layer laminate of 2.1 mm thickness having a structure of fiber-reinforced thermoplastic resin layer/aluminum plate/fiber-reinforced thermoplastic resin layer.

Physical properties of the obtained multilayer laminate are shown in Table 1.

Comparative Examples 1 to 3

For comparison, there were used a common steel plate (SS41) (Comparative Example 1), an aluminum plate (Comparative Example 2) and the same KP-sheet as used in Example 1 (except in that its thickness was 4.4 mm). Their physical properties and chemical resistance were evaluated. The results are shown in Table 1 and Table 2.

Example 4

A stampable sheet with a basis weight of 2,000 g/m$^2$ composed of glass fiber containing 80% or more of glass fiber with a fiber length of 10 mm or more and a polypropylene resin in a wt % ratio of 4:6 (KP-sheet, a trade name, mfd. by K-PLASHEET CORPORATION) was cut to dimensions of 250×250 mm. A common steel plate of 1.2 mm thickness was inserted between two of the sheets thus obtained, and they were set in a pressing machine and heated to 210° C. while applying a surface pressure of 30 kg/cm$^2$. The heated state was maintained for 2 minutes to obtain a three-layer laminate of 4.5 mm thickness having a structure of fiber-reinforced thermoplastic resin layer/steel plate/fiber-reinforced thermoplastic resin layer.

For the multilayer laminate obtained, noise level at impact and vibration damping rate were measured by means of the impact and vibration equipment shown in FIG. 1(A).

As schematically shown in FIG. 1(B), an impact was made by free fall of a steel ball with a diameter of about 11.0 mm and a mass of about 5.6 g from a height of about 500 mm.

The noise level was measured through a microphone placed in a predetermined position at a distance of about 50 mm from the multilayer laminate, and the vibration damping rate after about 0.04 seconds was determined by measuring the strength of the vibration by means of an accelerometer attached to the side reverse to the impact portion.

Figure 2:
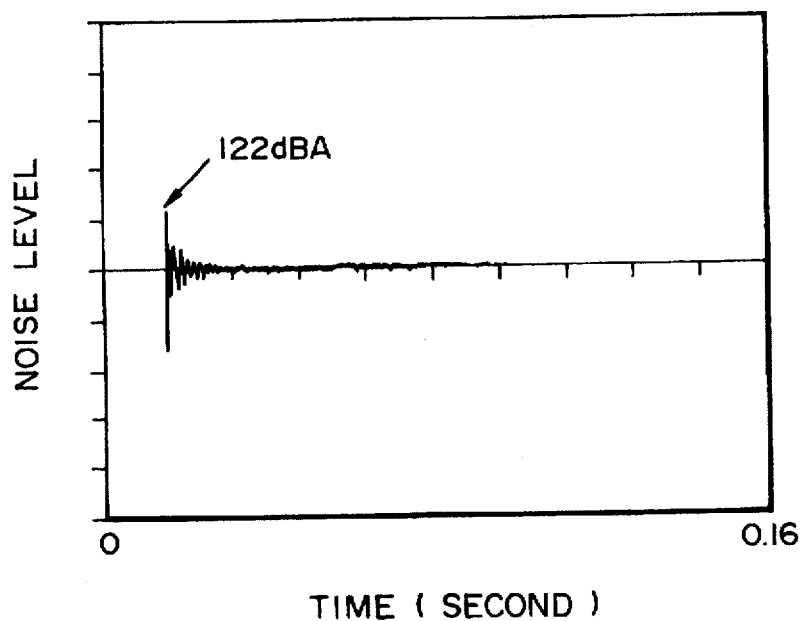
FIG. 2 is a chart showing the results of measuring the noise level of the multilayer laminate obtained in Example 4.
Figure 4:
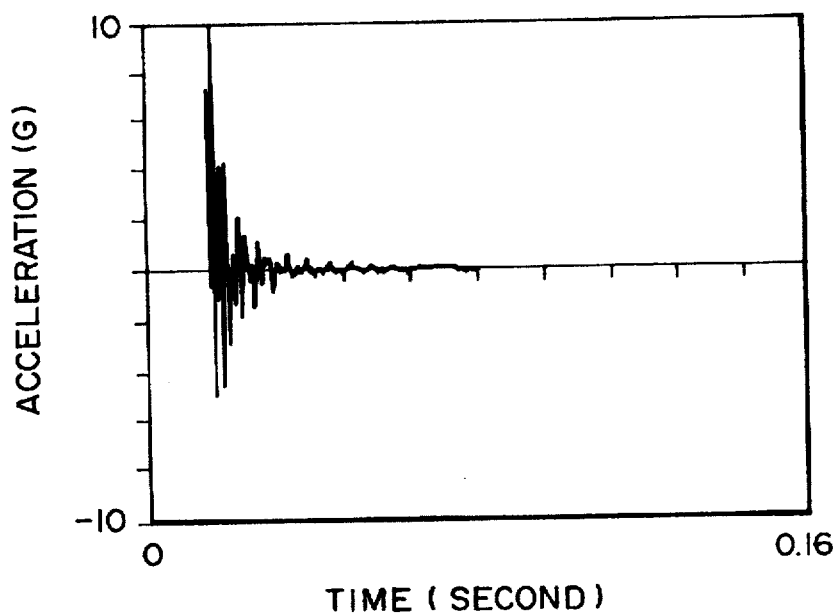
FIG. 4 is a chart showing the results of measuring the vibration of the multilayer laminate obtained in Example 4.

The results of measuring the noise level are shown in FIG. 2, and the damping rate of vibration in FIG. 4.

Comparative Example 4

For comparison, the same tests as in Example 4 were carried out except for using a 250×250 mm common steel plate of 2.0 mm thickness.

Figure 3:
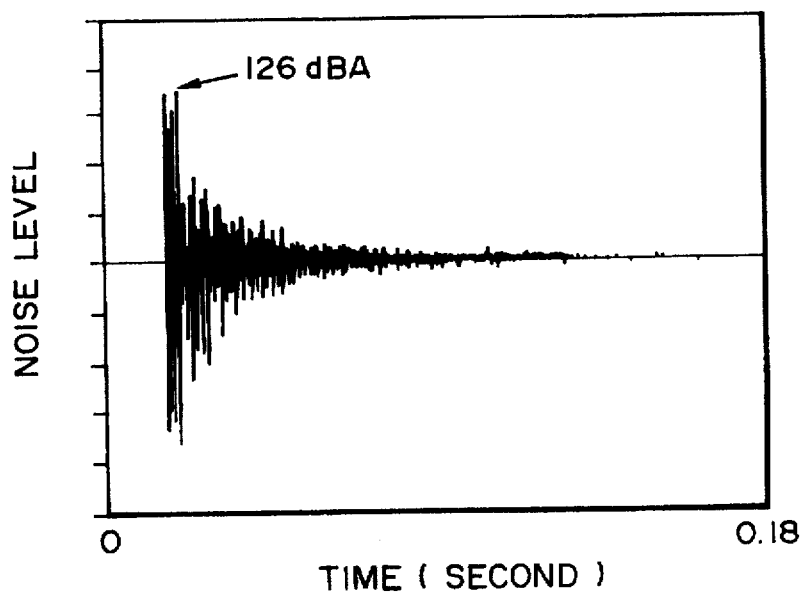
FIG. 3 is a chart showing the results of measuring the noise level of a steel plate alone in Comparative Example 1.
Figure 5:
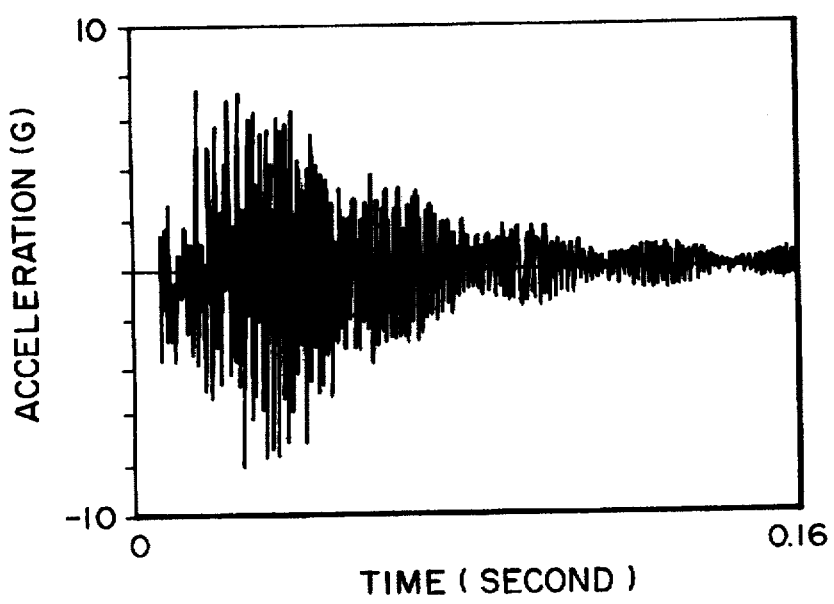
FIG. 5 is a chart showing the results of measuring the vibration of the steel plate alone in Comparative Example 1.

The results of measuring the noise level are shown in FIG. 3, and the damping rate of vibration in FIG. 5.

TABLE 1

Physical properties of multilayer laminates

| | Structure of laminate (Note 1) | Thickness (mm) | Specific gravity (g/cm$^3$) | Flexural modulus (Note 2) | Specific stiffness (Note 3) |
|---|---|---|---|---|---|
| Example 1 | KP/steel plate/KP | 2.5 | 3.1 | 8,900 | 6.7 |
| Example 2 | KP/steel plate/KP | 2.1 | 2.6 | 3,900 | 6.1 |
| Example 3 | KP/aluminum plate/KP | 2.1 | 1.65 | 3,100 | 8.8 |
| Comparative Example 1 | Steel plate | 1.2 | 7.9 | 21,000 | 3.5 |
| Comparative Example 2 | Aluminum plate | 1.7 | 2.7 | 7,200 | 7.2 |
| Comparative Example 3 | KP | 4.4 | 1.2 | 420 | 5.8 |

Note 1: KP denotes KP-sheet
Note 2: kgf/mm$^2$
Note 3: stiffness per unit weight

TABLE 2

Chemical resistance of multilayer laminate

| | Immersion in 30% hydrochloric acid at 22° C. for 7 days | Immersion in 50% sulfuric acid at 22° C. for 7 days | Immersion in electrolysis solution for battery at 22° C. for 7 days |
|---|---|---|---|
| Example 1 | No surface change | No surface change | No surface change |
| Comparative Example 1 | A corroded portion appeared Bubbles came out of the surface | Partly dissolved by corrosion | A corroded portion appeared on the surface |

INDUSTRIAL APPLICABILITY

The multilayer laminate having a super impact absorptivity of the present invention is excellent in impact resistance, is free from the formation of pinholes, unlike coated metal plates, and is very rarely rusted by exposure of the surface of the metal layer due to a scratch on the resin layer inflicted by a slight impact, and hence it is of the greatest utility as an impact-resistant board, a vibration-damping board and an acoustic insulation material.

We claim:

1. A multilayer laminate which consists essentially of a metal plate and at least two fiber-reinforced polypropylene layers containing a glass fiber having a length of 10 mm or more, said at least two fiber-reinforced polypropylene layers being laminated respectively on each side of the metal plate to completely encapsulate the metal plate, said multilayer laminate having a super impact absorpivity shown by a noise level at an impact of 125 dBA or below as determined by measuring a level of noise through a microphone placed in a predetermined position at a distance of about 50 mm from the multilayer laminate after allowing a steel ball to fall freely from a height of about 500 mm and impact said multilayer laminate, said steel ball having a diameter of about 11.0 mm and a mass of about 5.6 g, or a vibration damping rate of 1 G or below after about 0.04 seconds as determined by measuring a strength of a virbration by means of an accelerometer attached to a side reverse to the impacted portion after allowing a steel ball to fall freely from a height of about 500 mm and to impact said multilayer laminate, said steel ball having a diameter of about 11.0 mm and a mass of about 5.6 g.

2. A multilayer laminate according to claim 1, wherein said fiber-reinforced polypropylene layer is laminated to the metal plate through heat fusion.

3. A multilayer laminate according to claim 1, wherein the thickness of the fiber-reinforced thermoplastic layer is 0.2 mm or more.

4. A multilayer laminate according to claim 1, wherein the two layers of a glass fiber-reinforced polypropylene layer containing glass fibers are formed using a glass fiber-reinforced resin composition, said glass fiber-reinforced resin composition having been obtained by blending polypropylene with glass fibers.

5. A process for producing a multilayer laminate as set forth in claim 1, wherein said process consists essentially of placing on each side of a metal sheet, a fiber-reinforced polypropylene sheet previously heated to such an extent that the polypropylene is melted to become sufficiently flowable, and then compressing the resulting assembly.

6. A process for producing a multilayer laminate in claim 1, wherein said process consists essentially of holding a metal sheet between two fiber-reinforced polypropylene sheets previously heated to such an extent that the polypropylene melts to become sufficiently flowable, and then compressing the resulting assembly.

7. A process for producing a multilayer laminate according to claim 5, wherein the heating is conducted at a temperature of 160°–230° C.

8. A process for producing a multilayer laminate according to claim 5 or 6, wherein the compressing is effected at a compressive force of 5–300 kg/cm$^2$.

* * * * *